US009303900B2

(12) United States Patent
Van Horn et al.

(10) Patent No.: US 9,303,900 B2
(45) Date of Patent: *Apr. 5, 2016

(54) HALOGENATED ALKENE HEAT TRANSFER COMPOSITIONS WITH IMPROVED OIL RETURN

(71) Applicant: Arkema Inc., King of Prussia, PA (US)

(72) Inventors: Brett L. Van Horn, King of Prussia, PA (US); Philippe Bonnet, Lyons (FR); Benjamin Bin Chen, Wayne, PA (US); Maher Y. Elsheikh, Wayne, PA (US); Richard M. Crooker, Fogelsville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,266

(22) Filed: Apr. 30, 2013

(65) Prior Publication Data

US 2013/0246288 A1  Sep. 19, 2013

Related U.S. Application Data

(62) Division of application No. 12/667,140, filed as application No. PCT/US2009/036266 on Mar. 6, 2009, now Pat. No. 8,454,853.

(60) Provisional application No. 61/034,513, filed on Mar. 7, 2008.

(51) Int. Cl.
| *C09K 5/04* | (2006.01) |
| *F25B 1/00* | (2006.01) |
| *C09K 3/30* | (2006.01) |
| *C10M 171/00* | (2006.01) |
| *F25B 45/00* | (2006.01) |

(52) U.S. Cl.
CPC . *F25B 1/005* (2013.01); *C09K 3/30* (2013.01); *C09K 5/044* (2013.01); *C09K 5/045* (2013.01); *C10M 171/008* (2013.01); *F25B 45/00* (2013.01); *C09K 2205/112* (2013.01); *C09K 2205/122* (2013.01); *C09K 2205/126* (2013.01); *C09K 2205/32* (2013.01); *C10M 2203/1006* (2013.01); *C10M 2205/028* (2013.01); *C10M 2205/223* (2013.01); *C10M 2207/2835* (2013.01); *C10M 2209/043* (2013.01); *C10M 2209/1033* (2013.01); *C10N 2220/301* (2013.01); *C10N 2220/302* (2013.01); *C10N 2220/303* (2013.01); *C10N 2220/305* (2013.01); *F25B 2400/18* (2013.01)

(58) Field of Classification Search
CPC .. C10M 171/008; C10M 101/02; C09K 5/04; C09K 5/044; C09K 5/045; C09K 2205/112; C09K 2205/122; C09K 2205/32; F25B 2400/18
USPC .......................................................... 252/68
See application file for complete search history.

(56) References Cited

U.S. PATENT DOCUMENTS

| 5,688,432 | A | 11/1997 | Pearson | |
| 5,710,352 | A | 1/1998 | Tung | |
| 6,516,837 | B2 | 2/2003 | Thomas et al. | |
| 6,655,160 | B2 | 12/2003 | Roberts | |
| 7,438,825 | B1 * | 10/2008 | Chen et al. | 252/68 |
| 7,438,826 | B1 * | 10/2008 | Chen et al. | 252/68 |
| 7,442,321 | B1 * | 10/2008 | Chen et al. | 252/68 |
| 7,479,238 | B1 * | 1/2009 | Chen et al. | 252/68 |
| 7,695,635 | B2 * | 4/2010 | Singh et al. | 252/67 |
| 7,803,283 | B2 * | 9/2010 | Pham et al. | 252/67 |
| 7,833,433 | B2 * | 11/2010 | Singh et al. | 252/67 |
| 7,935,268 | B2 * | 5/2011 | Basu et al. | 252/67 |
| 8,034,251 | B2 * | 10/2011 | Merkel et al. | 252/67 |
| 8,066,901 | B1 * | 11/2011 | Hulse et al. | 252/67 |
| 8,070,975 | B2 * | 12/2011 | Pham et al. | 252/67 |
| 9,062,236 | B2 * | 6/2015 | Van Horn | C09K 5/045 |
| 2005/0096246 | A1 | 5/2005 | Johnson et al. | |
| 2006/0243945 | A1 | 11/2006 | Minor et al. | |
| 2006/0266976 | A1 | 11/2006 | Minor et al. | |
| 2007/0007488 | A1 | 1/2007 | Singh et al. | |
| 2007/0108403 | A1 | 5/2007 | Sievert et al. | |
| 2008/0157022 | A1 | 7/2008 | Singh et al. | |
| 2010/0326095 | A1 * | 12/2010 | Van Horn et al. | 62/77 |
| 2011/0001080 | A1 * | 1/2011 | Van Horn et al. | 252/68 |
| 2011/0012052 | A1 | 1/2011 | Van Horn et al. | |
| 2011/0309288 | A1 * | 12/2011 | Chen et al. | 252/68 |
| 2012/0007016 | A1 * | 1/2012 | Abbas | 252/68 |
| 2013/0096218 | A1 * | 4/2013 | Rached et al. | 521/170 |

FOREIGN PATENT DOCUMENTS

| GB | 2439209 A * | 12/2007 |
| WO | WO 2006069362 A2 * | 6/2006 |
| WO | WO 2006/094303 A2 | 9/2006 |
| WO | WO 2007/002625 A2 | 1/2007 |
| WO | WO 2007126414 A2 * | 11/2007 |

* cited by examiner

*Primary Examiner* — Douglas McGinty
(74) *Attorney, Agent, or Firm* — Steven D. Boyd

(57) ABSTRACT

The invention relates to heat transfer agents and heat transfer compositions containing hydrocarbon lubricating oils and halogenated alkene heat transfer fluid that promote oil flow and provide for improved oil return. The heat transfer compositions are useful in various heat transfer systems such as refrigeration, cooling, air conditioning, chiller operations.

19 Claims, No Drawings

HALOGENATED ALKENE HEAT TRANSFER COMPOSITIONS WITH IMPROVED OIL RETURN

The present application is a divisional application of the U.S. application Ser. No. 12/667,140 filed Dec. 29, 2009; and International application serial number PCT/US2009/36266 filed Mar. 6, 2009 which designated the United States; and U.S. provisional application Ser. No. 61/034513 filed Mar. 7, 2008.

FIELD OF THE INVENTION

The present invention relates to heat transfer agents and heat transfer compositions containing hydrocarbon lubricating oils and miscibility improving halogenated alkenes. The heat transfer agents and compositions have the benefit of providing improved oil-return without the need for oxygenated oils or oil solubilizing agents/surfactants. The heat transfer compositions are useful in various heat transfer systems such as refrigeration, cooling, air conditioning, and chiller operations. The heat transfer agents containing hydrocarbon lubricating oils and miscibility improving halogenated alkenes improve oil flow and provide for the efficient return of mineral oil lubricants from non-compressor zones back to a compressor zone in heat transfer systems.

BACKGROUND OF THE INVENTION

Most refrigeration compressors use mineral oil lubricants with chlorofluorocarbon (CFC) and hydrochlorofluorocarbon (HCFC) refrigerants. In addition to being inexpensive and rugged lubricants, mineral oils are miscible with CFCs and HCFCs, which is important in providing good oil return. In a system with poor oil return, the oil that leaves the compressor collects at various points in the refrigeration system and does not return to the compressor, leading to clogging, poor lubrication, and decreased efficiency.

With continued regulatory pressure limiting the use of ozone depleting substances, the refrigeration industry has been moving to non-ozone depleting hydrofluorocarbon (HFC) based refrigerants. Most HFCs, however, lack the miscibility with traditional lubricants such as mineral oils necessary to provide adequate performance. This has resulted in the implementation of oxygenated lubricants such as polyol ester (POE) oils, polyalkylene glycol (PAG) oils, and polyvinyl ether (PVE) oils or the use of surfactants/solubilizing agents with mineral oils. These new lubricants can be considerably more expensive than traditional mineral oil lubricants and can be extremely hygroscopic. Their combination with water can result in the undesirable formation of acids that can corrode parts of the refrigeration system and lead to the formation of sludges. Consequently, there is a need and opportunity to resolve this low solubility and oil return problem so that the refrigeration industry may utilize halogenated alkene heat transfer agents with hydrocarbon lubricating oils, such as mineral oil and/or alkyl benzene oil, alone or in combination with minor amounts of oxygenated lubricants.

Several refrigerant compositions have been developed incorporating a small fraction of low boiling hydrocarbons, such as butanes or pentanes, for the purposes of improving miscibility with mineral oil and thereby improving oil return. However, it has been recognized that the quantity of hydrocarbon in the refrigerant composition must be minimized to reduce the flammability of the refrigerant composition for the interest of safety, such as taught in U.S. Pat. No. 6,655,160 and U.S. Pat. No. 5,688,432. In the present invention, refrigeration compositions were discovered that provide for acceptable oil return while reducing the flammability risks associated with the hydrocarbon refrigerants.

U.S. Pat. No. 6,516,837 discloses the use of surfactants and/or solubilizing agents with Environmentally desirable refrigerants in systems where chlorine containing refrigerants are being replaced with non-chlorine containing refrigerants. The patent discloses that the surfactants/solubilizing agents are needed because many non-chlorine-containing refrigerants, including HFC's, are relatively insoluble and/or immiscible in the types of lubricants traditionally used such as mineral oil and alkylbenzenes or polyolefins.

WO 2007/002625 discloses the use of various tetrafluoropropenes in a variety of applications including heat transfer systems. The use of lubricants, optionally with compatibilizer to aid compatibility and/or solubility of the lubricant is disclosed. The use of the various tetrafluoropropenes with lubricants such as mineral oils, polyalkylbenzene, polyalkylene glycol oils, and the like is disclosed.

U.S. Pat. No. 5,710,352 discloses methods of preparing 1,1,1,3,3-pentafluoropropane 1-chloro-3,3,3-trifluoropropene and their use as solvents, foam blowing agents, refrigerants, cleaning agents, aerosol propellants, heat transfer media, dielectrics, fire extinguishing compositions and power cycle working fluids.

WO 2006/094303 discloses numerous refrigerant compositions comprising various combinations of selected hydrofluoroolefins, which includes 3,3,3-trifluoropropene, 2,3,3,3-tetrafluoropropene, and 1,3,3,3-tetrafluoropropene, with other hydrofluoroolefins, selected hydrofluorocarbons, selected hydrocarbons, dimethyl ether, carbon dioxide, $CF_3I$, and $CF_3SCF_3$. The application further discloses the combination of the refrigerant compositions with lubricating oils including polyol esters, polyalkylene glycols, polyvinyl ethers, mineral oils, alkyl benzenes, synthetic paraffins, synthetic naphthenes, poly(alpha)olefins. The application discloses that the described refrigerants are miscible with lubricants designed for hydrofluorocarbon refrigerants such as polyol esters, polyalkylene glycols, and polyvinyl ethers.

The use of oils other than mineral oil or alkyl benzene oil with more environmentally friendly refrigerants results in increased cost, both due to the higher costs of the oxygenated oils and due problems that arise due to incompatibility in existing equipment that contains mineral oil. The present invention addresses these needs of the refrigeration industry through the discovery of specific halogenated alkene heat transfer fluids which are more miscible with hydrocarbon lubricating oils thereby improving flow and permitting improved lubricant oil transport through a heat transfer system and lubricant oil return back to the system compressor from other system zones without the need for surfactants/solubilizers or oxygenated oils.

SUMMARY OF THE INVENTION

The present invention addresses these needs by providing heat transfer compositions comprising (1) at least one halogenated alkene heat transfer fluid and (2) a hydrocarbon lubricating oil wherein the halogenated alkene heat transfer fluid provides improved miscibility in the hydrocarbon lubricating oil. The halogenated alkene of component (1) is preferably: a hydrofluoroolefin (HFO), particularly trifluoropropene and/or tetrafluoropropene including HFO-1243zf (3,3,3-trifluoropropene), HFO-1234ze (1,3,3,3-tetrafluoropropene), and/or HFO-1234yf (2,3,3,3-tetrafluoropropene); hydrochlorofluoroolefin (HCFO), particularly HCFO- 1233zd (1-chloro-3,3,3-trifluoropropene) and HCFO-1233xf (2-chloro-3,3,3-trifluoropropene); a hydrobromofluoroolefin, or mixtures thereof. The heat transfer compositions may optionally include hydrofluorocarbons (HFCs), including difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,3,3,3-hexafluoropropane (HFC-236fa); 1,1,1,2,3,3,3-heptafluoropropane (HFC-227ea); 1,1,1,3,3-pentafluorobutane (HFC-365mfc); C3-C6 hydrocarbons, including propane, cyclopropane, iso-butane, n-butane, cyclobutane, n-pentane, neopentane, isopentane, cyclopentane; other HFOs, such as HFO-1225ye (1,2,3,3,3-pentafluoropropene), HFO-1336mzz (1,1,1,4,4,4-hexafluorobut-2-ene), and mixtures thereof. The heat transfer compositions may optionally include carbon dioxide, dimethyl ether, $CF_3SCF_3$, hydrofluoroethers, fluoketones and mixtures thereof.

It was discovered that the refrigerant compositions embodied by the present invention are unexpectedly miscible in and can provide effective oil return with hydrocarbon lubricating oils such as mineral oil and alkyl benzenes, unlike the hydrofluorocarbon refrigerants.

The lubricant may optionally contain minor amounts, less than 50wt %, of oxygenated lubricants such as POE oil, PAG oil, PVE oil, and mixtures thereof.

The hydrocarbon lubricating oil of component (1) may comprise those commonly known as "mineral oils" and/or "synthetic oils" in the field of compression refrigeration lubrication. "Mineral oils" comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). "Synthetic oils" comprise alkylaryls (i.e. linear and branched alkyl alkylbenzenes), synthetic paraffins and napthenes, and poly (alphaolefins).

DETAILED DESCRIPTION OF THE INVENTION

The present invention is directed toward heat transfer fluids comprising a combination of halogenated alkene(s) and a hydrocarbon lubricating oil that exhibit improved oil-return without the need for oil solubilizing agents/surfactants. The combination is useful as a heat transfer composition. The halogenated alkene is preferably: a hydrofluoroolefin (HFO), particularly HFO-1243zf (3,3,3-trifluoropropene), HFO-1234ze (1,3,3,3-tetrafluoropropene and/or HFO-1234yf (2,33,3-tetrafluoropropene); a hydrochlorofluoroolefin (HCFO), particularly HCFO-1233zd (1-chloro-3,3,3-trifluoropropene) and/or HCFO-1233xf (2-chloro-3,3,3-trifluoropropene); a hydrobromofluoroolefin or mixtures thereof. The heat transfer compositions may optionally include hydrofluorocarbons (HFCs), particularly difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,3,3,3-hexafluoropropane (HFC-236fa); 1,1,1,2,3,3,3-heptafluoropropane (HFC-227ea); 1,1,1,3,3-pentafluorobutane (HFC-365mfc); C3-C6 hydrocarbons, including propane, cyclopropane, iso-butane, n-butane, cyclobutane, n-pentane, neopentane, isopentane, cyclopentane; other HFOs, such as HFO-1225ye (1,2,3,3,3-pentafluoropropene), HFO-1336mzz (1,1,1,4,4,4-hexafluorobut-2-ene), and mixtures Thereof. The heat transfer compositions may optionally include carbon dioxide, dimethyl ether, $CF_3SCF_3$, and mixtures thereof.

Hydrocarbon lubricating oils of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Hydrocarbon lubricating oils of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins).

The compositions of the present invention can also comprise additional components such as viscosity modifiers, antioxidants, stabilizers, dyes, anti-foaming agents, foaming agents, surfactants, nanoparticles, corrosion inhibitors, radical scavengers, acid scavengers, other lubricants, etc. The composition can also include heat transfer agents which are not miscible in mineral oil so long as the combination so formed is sufficiently misicible in mineral oil to provide adequate oil return.

Though complete miscibility between refrigerant and lubricant may be desirable, it not usually required. Refrigerant R-408A, a blend of 7 wt % HFC-125 (pentafluoroethane), 46 wt % HFC-143a (1,1,1-trifluoroethane), and 47 wt % HCFC-22 (chlorodifluoromethane), is known to have low miscibility in mineral oil but can be used in refrigeration systems employing mineral oil. However, refrigerant blends containing only HFCs, such as R-404A, R-407C, and R-410A, tend to have very low miscibility in mineral oil such that they are usually used with oxygenated lubricants such as polyol ester oils, polyalkylene glycols, and polyvinyl ethers.

As new refrigerants have been developed to meet the increasing requirements for environmental sustainability, transitioning from chlorofluorocarbons to hydrofluorochlorocarbons to hydrofluorocarbons to reduce the ozone depleting potential of the refrigerants, the trend has been to develop more sophisticated lubricants to meet the needs resulting from incompatibility with the previous generations of lubricating oils. This trend was expected to continue with the next generation of halogenated alkene low global warming refrigerants.

The 2006 ASHRAE Handbook: Refrigeration, Chapter 7 "Lubricants in Refrigeration Systems," discloses that the chlorofluorocarbons R-11, R-12, and R-113 are considered completely miscible in mineral oil in all proportions and temperatures; hydrochlorofluorocarbons tend to display various degrees of partial miscibility, being mutually soluble above a critical solution temperature: R-123 is considered as highly miscible in mineral oil. R-22 is considered to have intermediate miscibility, as illustrated in an example with a naphthenic mineral oil (150 SUS) where the critical solution temperature was between 30 and 40° F. (−1 and 4° C.). R-115, a CFC, is considered to have low miscibility in mineral oil.

The inventors discovered that the heat transfer fluids of the present invention could be used with hydrocarbon lubricating oils, providing for improved oil return, while possessing a low global warming potential and low ozone depletion potential. In a preferred embodiment of this invention the halogenated alkene heat transfer fluids include trifluoropropenes and tetrafluoropropenes, more preferably 3,3,3-trifluoropropene (R-1243zf) 2,3,3,3-tetrafluoropropene (R-1234yf), E- and/or Z-1,3,3,3-tetrafluoropropene (R-1234ze), and mixtures thereof. In another preferred embodiment of this invention the halogenated alkene heat transfer fluids are monochlorofluoropropenes, dichlorofluoropropenes, and mixtures thereof, even more preferably 1-chloro-3,3,3-trifluoropropene (R-1233zd), 2-chloro-3,3,3-trifluoropropene (R-1233xf), and mixtures thereof, and even more preferably trans-1-chloro-3,3,3-trifluoropropene. The hydrochlorofluoropropenes of the present invention unexpectedly show complete miscibility in the hydrocarbon lubricating oils across a wide temperature range. In another embodiment of this invention the halogenated alkene heat transfer fluid is a hydrobromofluoropropene, preferably 2-bromo-1,3,3,3-tetrafluoropropene.

When adding a halogenated alkene heat transfer fluid of the present invention to an existing refrigerant composition for the purposes of improving the oil return, it may be desirable to limit the changes to the thermodynamic and thermal physical properties of the refrigerant composition, such as vapor pressure or theoretical capacity and performance. In such cases it is preferred to minimize the quantity of halogenated alkene heat transfer fluid incorporated into the refrigerant composition even if flammability is not a concern. The minimum quantity of halogenated alkene heat transfer fluid of the present invention required to provide acceptable oil return with hydrocarbon lubricating oils will depend upon any other heat transfer fluids in the refrigerant composition and upon the refrigeration or heat transfer equipment employed.

In a preferred embodiment of the present invention, it was discovered that hydrochlorofluoroalkenes, particularly R-1233zd, R-1233xf, and mixtures thereof, would are completely miscible in hydrocarbon lubricating oils across a wide temperature range and could therefore be effectively used as heat transfer fluids in systems employing hydrocarbon lubricating oils. It was also discovered that a small fraction of hydrochlorofluoroalkene heat transfer fluid, particularly R-1233zd, R-1233xf, and mixtures thereof, can be added to a traditional HFC refrigerant or refrigerant blend in order to improve the oil return when used with lubricants comprising hydrocarbon lubricating oils. Non-limiting examples of such HFC refrigerants and refrigerant blends include R-134a, R-404A, R-427A, R-407C, R-407A, R-410A, R-32, R-143a, R-125, R-152a, R-245fa, and mixtures thereof.

The preferred hydrochlorofluoropropenes of the present invention have low flammability and can thus be incorporated with HFC refrigerants to a high fraction with low risk of increasing the flammability heat transfer fluid. This is in contrast to when incorporating hydrocarbon heat transfer fluids, such butanes or pentanes, with HFC refrigerants where it is known that the quantity of hydrocarbon heat transfer fluid incorporated into the refrigerant must be minimized to reduce the risk of increasing the flammability of the refrigerant. A non-limiting example of such a hydrocarbon heat transfer fluid containing HFC refrigerant blend is R-422D, containing 65.1% R-125, 31.5% R-134a, and 3.4% R-600a (isobutane).

The hydrochlorofluoropropenes of the present invention, particularly R-1233zd, R-1233xf, and mixtures thereof, can be incorporated with hydrocarbon containing HFC refrigerants in order to promote oil flow and improve oil return particularly if the hydrocarbon containing HFC refrigerant exhibits marginal oil return in a given refrigeration or heat transfer equipment.

In a preferred embodiment of the present invention, the amount of hydrochlorofluoropropenes required to improve oil return of a heat transfer fluid comprising hydrofluorocarbons, optionally including hydrocarbon heat transfer fluids, is greater than about 0.5% to less than about 50%, more preferably greater than about 1 wt % and less than about 20 wt %, even more preferably greater than about 1% and less than about 10%, and even more preferably greater than about 1% and less than about 6%. In cases with marginal oil return, as little as 0.5% to 1% a hydrochlorofluoropropene of the present invention incorporated into a HFC-based refrigerant may be sufficient to provide for adequate oil return though more may be required.

The hydrochlorofluoroolefins of the present invention, particularly R-1233zd and/or R-1233xf, may also be used to promote oil flow and improve oil return of other low GWP refrigerants, including but not limited to HFO-1225ye, HFO-1234yf, HFO-1234ze, HFO-1243zf, HFO-1,336mzz, carbon dioxide, and mixtures thereof.

In another embodiment of this invention it was discovered the 3,3,3-trifluoropropene (R-1243zf) had unexpectedly good miscibility with hydrocarbon lubricating oils, particularly alkyl benzene oil, such that it can be used in refrigeration compositions comprising hydrocarbon lubricating oils while providing for adequate oil return. In another embodiment of this invention, the miscibilty of R-1243zf in hydrocarbon lubricating oils is high enough that it can be incorporated with other heat transfer fluids of lower miscibilty with hydrocarbon lubricating oils for the purposes of promoting oil flow and improving oil return. Such heat transfer fluids with lower miscibility in hydrocarbon lubricating oils include hydrofluorocarbons, including but not limited to HFC-32, HFC-143a, HFC-134a, HFC-134, HFC-125, HFC-245fa, and mixtures thereof. Since R-1243zf is flammable, it can be blended with non-flammable heat transfer fluids if a non-flammable refrigerant composition is desired. For instance, if it is desired to have a low-flammability to non-flammable heat transfer fluid for a refrigerant composition comprised of hydrocarbon lubricating oils, wherein the heat transfer fluid is comprised of R-1243zf and R-134a then it is preferred that the heat transfer fluid comprise no more than 50 wt % R-1243zf, more preferably no more than 25 wt % R-1243zf, and even more preferably no more 15 wt % R-1243zf. For a low-flammability to non-flammable heat transfer fluid comprised of R-1243zf and R-125 it is preferred that it contain no more than 50 wt % R-1243zf, and more preferably no more than 25 wt % R-1243zf. Other useful, non-limiting, low-flammability to non-flammable heat transfer fluids comprising R-1243zf may optionally contain other HFCs, such as R-143a, R-152a, R-32, R-245a; other HFOs, such as R-1234yf, R-1234ze, R-1225ye, R-1336mzz; hydrocarbons, such as butane, isobutane, pentanes; and mixtures thereof, preferably where the flammability of such heat transfer fluid does not exceed that of a heat transfer fluid consisting of about 50% R-134a and 50% R-1243zf. If a greater degree of flammability can be tolerated, heat transfer fluids comprising up to 100% R-1243zf can be used, Since R-1243zf is less flammable than many hydrocarbon heat transfer fluids, such as butanes and pentanes, it can be used to a higher fraction in the heat transfer fluid.

In another embodiment of the present invention it was discovered the tetrafluoropropenes, preferably 2,3,3,3-tetrafluoropropene (R-1234yf), even more preferably 1,3,3,3-tetrafluoropropene (R-1234ze), had unexpectedly good miscibility with hydrocarbon lubricating oils, particularly alkyl benzene oil, such that it can be used in refrigeration compositions comprising hydrocarbon lubricating oils while providing for adequate oil return. The miscibility of the tetrafluoropropenes of the present: invention with mineral oil was found to be significantly higher than that of the standard HFC refrigerants, such as R-134a, R-404a, R-407C. Surprisingly, the miscibilty of R-1234yf and R-1234ze in mineral oil and alkyl benzene oil was higher than that of R-134a. In another embodiment of this invention, the miscibilty of R-1234yf and R-1234ze in hydrocarbon lubricating oils is high enough that they can be incorporated with other heat transfer fluids of lower miscibilty with hydrocarbon lubricating oils for the purposes of promoting oil flow and improving oil return. R-1234yf and R-1234ze have very low flammability characteristics and can thus be combined with other low flammability or non-flammable refrigerants without creating a highly flammable heat transfer fluid. If a non-flammable heat transfer fluid is required, R-1234yf and/or R-1234ze can be blended with non-flammable heat transfer fluids. For instance, if it is desired to have a non-flammable heat transfer fluid for a refrigerant composition comprised of hydrocarbon lubricating oils, wherein the heat transfer fluid is comprised of R-1234yf and/or R-1234ze and R-134a then it is preferred that the heat transfer fluid comprise no more than about 90 wt % R-1234yf and/or R-1234ze, more preferably no more than 80 wt % R-1234yf and/or R-1234ze, and even more preferably no more 75 wt % R-1234yf and/or R-1234ze. For a non-flammable heat transfer fluid comprised of R-1234yf and/or R-1234ze and R-125 it is preferred that it contain no more than 90 wt % R-1234yf and/or R-1234ze, and more preferably no more than 80 wt % R-1234yf and/or R-1234ze. Other useful, non-limiting, low-flammability to non-flammable heat transfer fluids comprising R-1234yf and/or R-1234ze may optionally contain other HFCs, such as R-143a, R-152a, R-32, R-245a; other HFOs, such as R-1243zf, R-1225ye, R-1336mzz; hydrocarbons, such as butane, isobutane, pentanes; and mixtures thereof.

Of particular interest are non-flammable to low-flammability heat transfer fluid compositions used in tow temperature applications. Preferred non-flammable compositions of the present invention comprise R-1234yf and/or R-1234ze, R-32, and R-125, optionally containing R-1233zd and/or R-1233xf; more preferably comprise R-1234yf, R-32, and R-125, optionally containing R-1233zd and/or R-1233xf; and even more preferably comprising from 30% to 50% R-1234yf and enough R-125 to render the heat transfer fluid non-flammable, optionally containing R-1233zd and/or R-1233xf. More preferable low GWP heat transfer fluids for low temperature applications are low-flammability compositions comprising R-1234yf and R-32, optionally containing R-1233zd and/or R-1233xf; more preferably comprising from about 20% to about 80% R-1234yf and from about 80% to about 20% R-32, optionally containing R-1233zd and/or R-1233xf; even more preferably from about 40% to 70% R-1234yf and from about 60% to 30% R-32, optionally containing R-1233zd and/or R-1233xf; and even more preferably from about 55% to 65% R-1234yf and from about 45% to about 35% R-32, optionally containing R-1233zd and/or R-1233xf. Other useful compositions are heat transfer fluids comprising R-1234yf, R-32, and R-125; preferably containing from about 20% to about 80% R-1234yf, more preferably from about 40% to about 60% R-1234yf, and enough R-125 to render the blend non-flammable. Other low-flammability heat transfer fluid may optionally also incorporate R-1243zf, R-1234ze, R-152a, R-143a, R-134a, butanes, propane, carbon dioxide, and mixtures thereof.

Another embodiment of this invention is a method for improving the oil return of an existing refrigeration, air conditioning, or heat transfer system wherein the halogenated alkene heat transfer fluids of the present invention are added to existing equipment. This may optionally include first removing part or all of the heat transfer fluid already in the said existing refrigeration, air conditioning, or heat transfer equipment. The halogenated alkene heat transfer fluid of the present invention may optionally be combined with a carrier lubricant before adding to the existing refrigeration, air conditioning, or heat transfer fluid.

For typical applications, the numerous compounds in refrigeration mineral oils can be grouped into the following structures: (1) paraffins, (2) naphthenes (cycloparaffins), (3) aromatics, and (4) nonhydrocarbons. Paraffins consist of all straight-chain and branched-carbon-chain saturated hydrocarbons. Naphthenes are also completely saturated but consist of cyclic or ring structures. Aromatics are unsaturated cyclic hydrocarbons containing one or more rings characterized by alternate double bonds; benzene is a typical example.

The preceding structural components do not necessarily exist in pure states. In fact, a paraffinic chain frequently is attached to a naphthenic, or aromatic structure. Similarly, a naphthenic ring to which a paraffinic chain is attached may in turn be attached to an aromatic molecule. Because of these complications, mineral oil composition is usually described by carbon type and molecular analysis.

In carbon type analysis, the number of carbon atoms on the paraffinic chains, naphthenic structures, and aromatic rings is determined and represented as a percentage of the total. Thus, % $C_P$, the percentage of carbon atoms having a paraffinic configuration, includes not only free paraffins but also paraffinic chains attached to naphthenic or to aromatic rings. Similarly, % $C_N$ includes carbon atoms on free naphthenes as well as those on naphthenic rings attached to aromatic rings, and % $C_A$ represents carbon on aromatic rings. Carbon analysis describes a lubricant in its fundamental structure, and correlates and predicts many physical properties of the lubricant.

Traditional classification of oils as paraffinic or naphthenic refers to the number of paraffinic or naphthenic molecules in the refined lubricant. Paraffinic crudes contain a higher proportion of paraffin wax, and thus have a higher viscosity index and pour point than to naphthenic crudes.

Alkylbenzene lubricating oils have alkyl side chains that are either branched or linear, with a distribution in chain lengths typically from 10 to 20 carbons, though other alkyl chain length distributions are possible. Another preferred alkylbenzene lubricating oil comprises at least one alkylbenzene of the form: $(C_6H_6)$-$C(CH_2)(R_1)(R_2)$ where $(C_6H_6)$ is a benzyl ring and $R_1$ and $R_2$ are saturated alkyl groups, preferably containing at least one iso$C_3$ group, more preferably from 1 to 6 iso$C_3$ groups. Either $R_1$ or $R_2$ may be a hydrogen atom, but preferably not both.

The hydrocarbon lubricating oils of the present invention range from very low to high viscosity, preferably with viscosities at 100° F. from 15 to 800 cSt, and more preferably from 20 to 100 cSt. The typical refrigeration lubricating oils used in the present invention had viscosities of 15, 32, 68, and 100 cSt at 100° F. The mineral oil based hydrocarbon lubricating oils of the present invention are preferably naphthenic oils, with % $C_P$ preferably less than 50%. The naphthenic rings of naphthene fraction of the preferred mineral oils may contain a distribution of carbon lengths, but preferably contain a majority of C5 to C7 naphthenic rings. If a paraffinic mineral oil is used, the halogenated alkene heat transfer fluid of the present invention is preferably a hydrochlorofluoroalkene, more preferably a chloro-trifluoropropene, and more preferably 1-chloro-3,3,3-trifluoropropene.

The following non-limiting examples are hereby provided as reference:

EXAMPLES

The non-limiting list of refrigerants used in the following examples include:

R-22 is refrigerant HCFC-22 (chloro-difluoromethane)
R-404A, a refrigerant blend containing 44% R-125 (pentafluoroethane), 52% R-143a (1,1,1-trifluoroethane), and 4% R-134a (1,1,1,2-tetrafluoroethane)
R-408A, a refrigerant blend containing 7% R-125, 46% R-143a, and 47% R-22.
R-422D, a refrigerant blend containing 65.1% R-125, 31.5% R-134a, and 3.4% R-600a (isobutane).
R-407C, a refrigerant blend containing 23% R-32, 25% R-125, and 52% R-134a.
R-1243zf is 3,3,3-trifluoropropene
R-1234yf is 2,3,3,3-tetrafluoropropene
R-1234ze is trans-1,3,3,3-tetrafluoropropene
R-1233zd is 1-chloro-3,3,3-trifluoropropene, predominantly or essentially trans-isomer
R-1233xf is 2-chloro-3,3,3-trifluoropropene The non-limiting list of common lubricating oils used in these examples include:

MO-150: 150 SUS viscosity mineral oil (National Refrigerants Inc., produced by Witco Corp.)

MO-300: 300 SUS viscosity mineral oil (National Refrigerants Inc., produced by Witco Corp.)

AB-150: 150 SUS viscosity synthetic alkyl benzene oil (National Refrigerants Inc., or Zerol 150 from Nu-Calgon Inc. CAS#68855-24-3)

PAG-150: 150 ISO viscosity double-end capped polyalkylene glycol (Temperature Control Division, Four Seasons Part No. 59003).

Refrigerant/Oil Miscibility Test

To determine the miscibility limit of a low boiling refrigerant in a lubricant, a known quantity of lubricant was loaded into a calibrated glass pressure vessel. A slight vacuum was pulled on the vessel to remove excess air. Using a high pressure syringe pump, refrigerant was incrementally added to the pressure vessel. After each addition of liquid refrigerant, the refrigerant and lubricant were mixed and then allowed to stand for several minutes after which the number of liquid phases in the pressure vessel was visually observed. The composition where mixture transitions from one phase to two distinct liquid phases is the miscibility limit, and is reported as the weight percent (wt %) of refrigerant in the liquid composition. The miscibility limit may also be identified by starting with a two-phase mixture containing excess refrigerant whereby refrigerant is carefully vented from the vessel in increments until a one-phase composition is achieved. These tests were performed at ambient temperature.

For high boiling refrigerants, with boiling points around or above ambient temperature, mixtures of refrigerant and lubricant were made by simple addition to the desired composition.

Miscibility of HFC and HCFC Based Refrigerants in Lubricating Oils

Comparative Examples 1 through 6

Using the refrigerant/oil miscibility test described previously, the miscibility limit of several HFC and HCFC refrigerants and refrigerant blends was tested in mineral oil, alkyl benzene oil, and polyol ester oil; the results as shown in Table 1 in comparative examples 1 through 6. In comparative example 1, it was found that R-404A has very low miscibility in mineral oil, In comparative example 5, R-407C was found to be essentially immiscible with mineral oil. R-134a, as shown in comparative examples 2, 3, and 4, was found to have very low miscibility in mineral oil, low but somewhat higher miscibility in alkyl benzene oil, and good miscibility in polyalkylene glycol oil. In comparative example 7, R-408A was found to have partial miscibility with mineral oil, with an observed miscibility limit in MO-150 of about 20 wt %.

Miscibility of HFO, HCFO, and HCO in Lubricating Oils

Examples 7 through 13

Using the refrigerant/oil miscibility test described previously, the miscibility limit of selected hydrofluoroolefin, hydrochlorofluoroolefin, and hydrochloroolefin embodied in the present invention were tested in mineral oil, alkyl benzene oil, polyalkylene glycol oil, and polyol ester oil; the results as shown in Table I with examples 7 through 13. Examples 12 through 13 show that R-1233zd (trans-isomer) was essentially completely miscible in all the of the lubricants it was tested in, and is therefore expected to be particularly effective oil-return agent when blended with other refrigerants having a lower miscibilty in lubricant or when used alone as a refrigerant.

It is surprising that though R-1234yf was found to have a lower solubility in PAG-150 oil than R-134a, the hydrofluoroolefins of the present invention, including R-1243zf, R-1234ze, and R-1234yf, were found to have significantly higher miscibility in mineral oil and particularly alkyl benzene oil than HFC refrigerants. The miscibility limit of R-1234)A R-1234ze, and particularly R-1243zf in mineral oil and alkyl benzene oil was found to be around or greater than that of R-408A in mineral oil. Therefore, R-1234$_2$/f, R-1234ze, and R-1243zf could be used in heat transfer compositions with mineral oil and/or alkyl benzene oil to promote oil flow and improve oil return.

TABLE 1

Miscibility Limit of Refrigerants in Lubricants

| Example | Refrigerant | Lubricant | Miscibility Limit (wt % in Lubricant) |
|---|---|---|---|
| 1 | R-404A | MO-150 | 5 to 6 |
| 2 | R-134a | MO-150 | <3 |
| 3 | R-134a | PAG-150 | 66 |
| 4 | R-134a | AB-150 | 8 |
| 5 | R-407C | MO-150 | <5 |
| 6 | R-408A | MO-150 | 20 |
| 7 | R-1234yf | MO-150 | 15 |
| 8 | R-1234yf | PAG-150 | 47 |
| 9 | R-1234yf | AB-150 | 28 |
| 10 | R-1234ze | MO-150 | 18 |
| 11 | R-1243zf | MO-150 | 22 |
| 12 | R-1233zd | MO-150 | >99 |
| 13 | R-1233zd | AB-150 | >90 |

Miscibility of R-1233zd at Various Temperatures:

Example 14

To a clean sample vial was added 3.87gram of R-1233zd (70% trans-isomer, 30% cis-isomer). MO-150 mineral oil was incrementally added to provide compositions ranging from 0.3 to 87.5wt % oil. After each addition the sample vial was sealed, then shaken to mix, then allowed to sit for a few minutes to equilibrate at room temperature. The number of phases was then visually checked. Following the third addition of mineral oil, after the number of phases was visually checked at room temperature the sample vial was placed into a freezer maintained at −20° C. and allowed to equilibrate. The number of phases was then be checked at −20° C. The sample vial would then be removed from the freezer in preparation for another addition of mineral oil. The final composition reached during this set of additions was 87.5 wt % oil.

This provided miscibility data at ambient temperature (20° C.) from 0.3 to 87.5 wt % oil and at −20° C. from 1.8 to 87.5 wt % oil. Two separate samples were prepared: one by adding 0.1 g of the R-1233zd to a sample vial containing 5.18 g of MO-150 to produce a composition containing 97.2 wt % oil and the other by adding 4.55 g of R-1233zd to a sample vial containing 6.41 g of MO-150 to produce a composition containing 41.5% R-1233zd. The appearance of these two compositions was checked at ambient temperature, −20° C., and −35° C. The results at ambient and −20° C. are shown in Table 2. In all cases of example 14 only one phase was observed; the two compositions were very slightly cloudy at −20° C. This results indicate that R-1233zd has very high to complete miscibility with mineral oil from 35° C. to room temperature.

TABLE 2

R-1233zd miscibility in Mineral Oil

| Wt % Mineral Oil | # of Phases (20° C./−20° C.) | Appearance (20° C./−20° C.) |
|---|---|---|
| 0.3 | 1/ | clear/ |
| 1.0 | 1/ | clear/ |
| 1.8 | 1/1 | clear/clear |
| 8.9 | 1/1 | clear/clear |
| 19.5 | 1/1 | clear/clear |
| 28.5 | 1/1 | clear/clear |
| 37.3 | 1/1 | clear/clear |
| 41.5 | 1/1 | clear/clear |
| 45.2 | 1/1 | clear/clear |
| 62.0 | 1/1 | clear/clear |
| 71.4 | 1/1 | clear/cloudy |
| 87.5 | 1/1 | clear/cloudy |
| 97.2 | 1/1 | clear/clear |

Example 15

To a clean sample bottle was added 42.32 g of R-1233xf and 39.92 g of MO-150, to produce a composition with 51.5% R-1233xf. The sample vial was sealed and mixed at ambient temperature. At ambient temperature (23° C.) the composition was miscible, with a single, clear phase. The sample was placed in a constant temperature freezer and maintained at −20° C. until equilibrium was reached. At 20° C. the composition was miscible with a single, clear phase. The sample was then maintained at −35° C. until equilibrium was reached. At −35° C. the composition was miscible, with a single clear phase.

Comparative Example 16

To a clean glass pressure vessel was added 29.4 g of MO-150 and 17.8 g of R-22, to produce a composition with 37.7% R-22. The sample was mixed at ambient temperature. At ambient temperature (23° C.) the composition was miscible, with a single, clear phase. The sample was placed in a constant temperature freezer and maintained at −20° C. until equilibrium was reached. At −20° C. the composition had phase separated, with a clear oil-rich upper phase and a small fraction of a clear refrigerant-rich lower phase. The sample was then maintained at −35° C. and allowed to sit for two hours. At −35° C. the composition was phase separated with an oil-rich upper phase and small fraction of a refrigerant-rich lower phase. The lower half of the oil-rich phase was very cloudy while the upper half of the oil-rich phase was relatively clear. Comparative example 16 shows that a common hydrochlorofluorocarbon, R-22, may be miscible with mineral oil at ambient temperature but will phase separate at low temperature, whereas R-1233zd and R-1233xf, as seen in examples 13 and 14, were found to miscible in mineral oil to very low temperature. R-1233zd and R-1233xf are therefore effective oil-return agents even in low temperature refrigeration.

Oil-Return Tests

The oil return performance of refrigerants with lubricants was simulated using an oil-return test apparatus operated as follows: A coil of standard 10 mm copper tubing, with five coil loops having an overall diameter 165 mm coiled around the vertical axis with the refrigerant entering the bottom of the coil. At the outlet of the coil is a vertical riser of approximately 230 mm of ¼" standard copper tubing. Before the start of a test, approximately 10 g of lubricant is added to the coil. The entire coil is then submerged in a constant temperature bath maintained at 0° C. The inlet of the coil is connected to a refrigerant cylinder for liquid delivery. At the start of a test, liquid refrigerant is passed through the coil where it may dissolve or dislodge some lubricant. The liquid refrigerant with lubricant are then delivered to a collection vessel with an outlet fir refrigerant vapor. The refrigerant flowrate is maintained at approximately 0.25 m$^3$/hr using a metering valve prior to the collection vessel. The test is run for 15 minutes afterwhich the refrigerant feed is stopped and the oil collected. The oil return is evaluated as the percentage of the oil transferred to the collection vessel in the 15 minute test period.

Comparative Examples 17, 18, and 19

The oil-return test described previously were performed using MO-300. For comparative example 17 the refrigerant was R-408A, for comparative example 18 the refrigerant was R-134a, and for comparative example 19 the refrigerant was R-422D. With R-134a the percent oil transferred was less than about 5.4% (based on the average of five runs). This example shows how a low miscibility refrigerant will have poor oil return. With R-408A, a refrigerant blend with sufficient miscibility with mineral oil to provide sufficient oil return in many cases, the percent oil transferred was only 23.4%. R-422D is considered a mineral oil tolerant refrigerant blend, in which a small fraction of hydrocarbon heat transfer fluid is added with the hydrofluorocarbon refrigerants. With R-422D the percent mineral oil transferred was only 5.4%, slightly higher than with R-134a.

Examples 20, 21 and 22

Refrigerant blends were prepared with R-134a and R-1233zd (essentially trans-isomer). The blends contained 20 wt % R-1233zd for example 20, 10 wt % R-1233zd for example 21, and 6 wt % R-1233zd for example 22. The refrigerant blends were tested in with the oil-return test as in comparative example 17. At only 6 wt % R-1233zd, the percent oil transferred was similar to that of R-422D. The percent oil transferred increased as the fraction of R-1233zd in the blend increased. This example shows that R-1233zd can be effective at promoting oil flow and improving oil return even when used as only a very minor component in a refrigerant blend.

Examples 23

A refrigerant blend was prepared with 41 wt % R-32 and 59 wt % R-1234yf, The refrigerant blend was tested in with the oil-return test as in comparative example 17, except the oil used was AB-150. The percent oil-returned was greater than when using R-134a or R-422D with MO-300 and similar to that of R-408A with MO-300, as seen in Table 3.

Examples 24

A refrigerant blend was prepared with 50 wt % R-134a and 50 wt % R-1243zf. The refrigerant blend was tested in with the oil-return test as in comparative example 17. The percent oil-returned was greater than when using R-134a or R-422D as seen in Table 3.

Example 25

The oil-return test was performed as in example 17 except the refrigerant was R-1234yf and the lubricant was MO-150. The test sampling period was only 13 min 40 sec, instead of the usual 15 min. Even with an abbreviated sampling period, a high percentage of oil was transferred, greater than using R-134a, R-422D, R-408A with MO-300.

Example 26

The oil-return test was performed as in example 17 except the refrigerant was a blend of 94% R-422D and 6% R-1233zd. The percent oil transferred was 10.3%, greater than using R-422D alone with MO-300.

TABLE 3

Oil-Return Test using Refrigerants and Lubricants

| Example | Refrigerant | Oil | % Oil Transferred |
|---|---|---|---|
| 17 | R-408A | MO-300 | 24.3 |
| 18 | R-134a | MO-300 | <5.4 |
| 19 | R-422D | MO-300 | 5.4 |
| 20 | R-134a/R-1233zd (80/20) | MO-300 | 16.5 |
| 21 | R-134a/R-1233zd (90/10) | MO-300 | 6.3 |
| 22 | R-134a/R-1233zd (94/6) | MO-300 | 5.4 |
| 23 | R-32/R-1234yf (41/59) | AB-150 | 23.9 |
| 24 | R-134a/R-1243zf (50/50) | MO-300 | 16.6 |
| 25 | R-1234yf | MO-150 | 53* |
| 26 | R-422D/R-1233zd (94/6) | MO-300 | 10.3 |

Example 27

R-1243zf and R-134a were individually tested in sealed tube tests with AB-150 according to ASHRAE Standard 97. The sealed tubes were maintained at 175° C. for 14 days, after which they were visually observed for signs of degradation and phase separation, and the liquid contents tested for total acid number (TAN) by gas chromatography (GC) and ion chromatography (IC) according to a modified ASTM 664. R-1243zf was found to be stable in AB-150. R-1243zf was found to be miscible in AB-150 at room temperature while R-134a formed a separate phase.

Example 28

A blend of 50% R-1243zf and 50% R-134a was tested in sealed tube tests with AB-150 according to ASHRAE Standard 97. The sealed tubes were maintained at 175° C. for 14 days, after which they were visually observed for signs of degradation and phase separation, and the liquid contents tested for total acid number (TAN) by gas chromatography (GC) and ion chromatography (IC) according to a modified ASTM 664. The blend of R-134a and R-1243zf was found to be stable in AB-150. Two liquid phases were observed in the sample: a lower liquid phase of predominantly R-134a and an upper liquid phase of predominantly AB-150 and R-1243zf.

The invention claimed is:

1. A refrigerant composition comprising (1) the halogenated alkene heat transfer fluid 2,3,3,3-tetrafluoropropene, and (2) a mineral oil wherein said halogenated alkene and said mineral oil exhibit a oil-retun of about 53%.

2. The refrigerant composition of claim 1 further comprising a hydrofluorocarbon, a hydrofluoroolefin other than 2,3,3,3-tetrafluoropropene, a hydrocarbon, carbon dioxide, dimethyl ether, a fluorinated ether, or mixtures thereof.

3. The refrigerant composition of claim 2 wherein said hydrofluorocarbon is selected from the group consisting of difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134a); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,3,3,3-hexafluoropropane (HFC-236fa); 1,1,1,2,3,3,3-heptafluoropropane (HFC-227ea); 1,1,1,3,3-pentafluorobutane (HFC-365mfc), and mixtures thereof.

4. The refrigerant composition of claim 2 where the hydrofluorocarbon is selected from the group consisting of difluoromethane (HFC-32); 1,1-difluoroethane (HFC-152a); 1,1,1-trifluoroethane (HFC-143a); 1,1,1,2-tetrafluoroethane (HFC-134a); 1,1,1,2,2-pentafluoroethane (HFC-125); 1,1,1,3,3-pentafluoropropane (HFC-245fa), and mixtures thereof.

5. The refrigerant composition of claim 2 wherein the hydrocarbon comprises a C3-C5 hydrocarbon or mixtures thereof.

6. The refrigerant composition of claim 5 where the C3-C5 hydrocarbon is selected from the group consisting of propane, n-butane, iso-butane, n-pentane, iso-pentane, neo-pentane, cyclopentane, and mixtures thereof.

7. The refrigerant composition of claim 1 further comprising an oxygenated lubricating oil selected from the group consisting of polyalkylene glycols, polyol ester oils, polyvinyl ethers, and mixtures thereof wherein the fraction of mineral oil relative to said oxygenated lubricating oil is greater than about 50 wt %.

8. The refrigerant composition of claim 7 wherein the fraction of mineral oil relative to said oxygenated lubricating oil is greater than about 70 wt %.

9. The refrigerant composition of claim 7 wherein the fraction of mineral oil relative to said oxygenated lubricating oil is greater than about 80 wt %.

10. The refrigerant composition of claim 2 wherein the hydrofluoroolefin other than 2,3,3,3-tetrafluoropropene is selected from the group consisting of C3 and C4 hydrofluoroolefins containing at least one fluorine atom, at least one hydrogen atom, and at least one alkene linkage.

11. The refrigerant composition of claim 10 wherein said hydrofluoroolefin other than 2,3,3,3-tetrafluoropropene is selected from the group consisting of 1,2,3,3,3-pentafluoropropene (HFO1225ye) and E- and/or Z-1,1,1,4,4,4-hexafluorobut-2-ene (HFO-1336mzz).

12. The refrigerant composition of claim 4 comprising from greater than about 1 wt % to less than about 99 wt % said halogenated alkene heat transfer fluid and from greater than about 1 wt % to less than about 99 wt % said hydrofluorocarbon.

13. The refrigerant composition of claim 12 further comprising less than about 4 wt % of a hydrocarbon selected from the group consisting of propane, n-butane, iso-butane, n-pentane, iso-pentane, neo-pentane, cyclopentane, and mixtures thereof.

14. The refrigerant composition of claim 2 wherein said hydrofluorocarbon is HFC-32.

15. The refrigerant composition of claim 14 comprising from bout 20 wt % to about 80 wt % 2,3,3,3-tetrafluoropropene and from about 80 wt % to about 20 wt % HFC-32.

16. The refrigerant composition of claim 15 comprising from about 40 wt % to about 70 wt % 2,3,3,3-tetrafluoropropene and from about 60 wt % to about 30 wt % HFC-32.

17. The refrigerant composition of claim 16 comprising from about 55 wt % to about 65 wt % 2,3,3,3-tetrafluoropropene and from about 45 wt % to about 35 wt % HFC-32.

18. The refrigerant composition of claim 16 further comprising HFC-125.

19. The refrigerant composition of claim 16 further comprising HCFO-1233zd.

\* \* \* \* \*